Dec. 18, 1956   C. CHUTE   2,774,168
ICE FISHING APPARATUS
Filed May 20, 1954
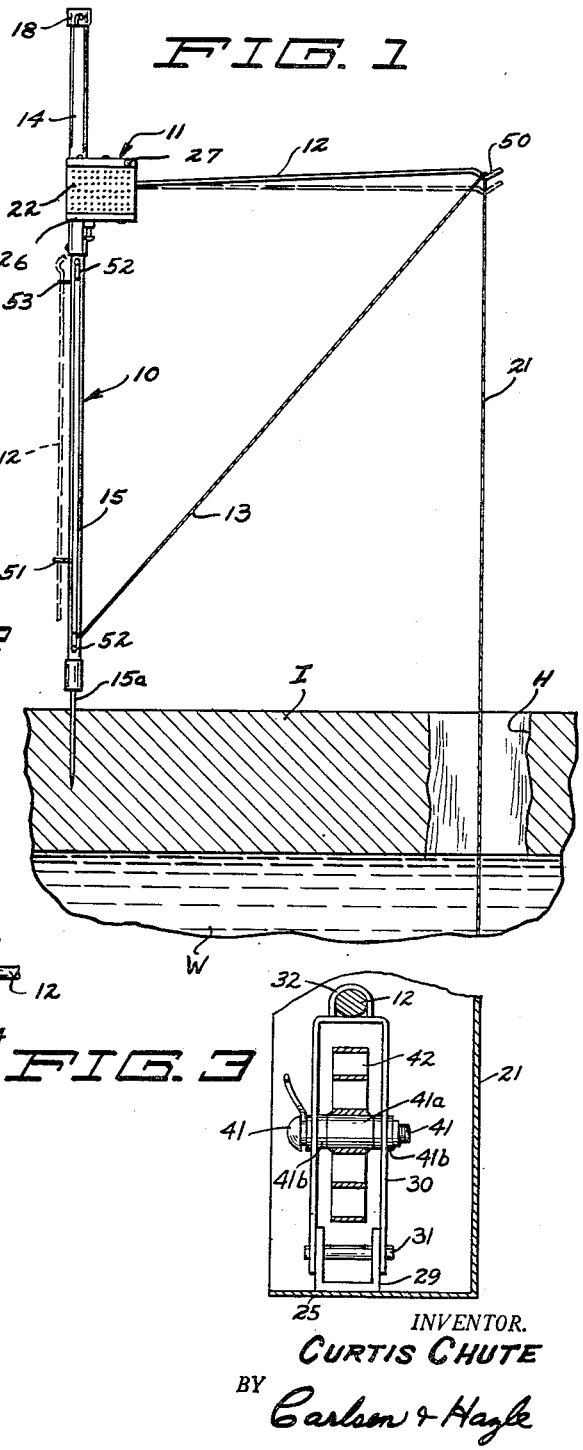
INVENTOR.
CURTIS CHUTE
BY Carlsen & Hagle
ATTORNEYS

United States Patent Office 2,774,168
Patented Dec. 18, 1956

2,774,168

ICE FISHING APPARATUS

Curtis Chute, Wayzata, Minn.

Application May 20, 1954, Serial No. 431,188

1 Claim. (Cl. 43—17)

This invention relates generally to equipment used in the sport of fishing through the ice and more particularly to signaling devices for indicating to the fisherman the presence of a bite or a catch on his fishing line.

In the sport of ice fishing which comprises fishing through a hole in the ice layer covering the lake or other body of water fished, it is frequently desirable to leave the fishing line unattended while the fisherman warms his hands or engages in other activities. When this is done it is advantageous to have some form of signaling means associated with the line to indicate any pull on the line. However, mere visual means such as in a tip-up or like device are frequently inadequate and furthermore such means are considered illegal in many areas.

It is accordingly the primary object of my invention to provide an apparatus for ice fishing adapted to hold the fishing line and give a momentary audible buzzing signal upon any pull being exerted on the line.

Another object of my invention is to provide an improved ice fishing apparatus adapted to be mounted on the ice adjacent the fishing hole and having a line holding means associated with a signaling device mounted on the post to indicate the presence of a fish on the line, said apparatus, however, remaining unchanged in appearance after the signal.

Still another object is to provide an ice fishing apparatus adapted to hold the fishing line and audibly signal a catch thereon which apparatus is readily collapsible for storage and economical to manufacture and operate.

With these and other objects in view my invention broadly comprises an elongated post adapted to be mounted in an upright position on the ice, a buzzer housing mounted on the post, a buzzer mechanism in the housing, battery means, an electric circuit connecting the battery means to the buzzer mechanism, a master switch in said circuit, spring means biasing the switch toward an open condition, an actuator arm on the switch for closing the switch against the bias of the spring means, said arm extending outwardly from the housing and a substantial distance therebeyond and having means at its extended end for attaching a fishing line thereto.

The above mentioned and still additional objects will be brought to light during the course of the following specification, reference being made to the accompanying drawing, in which—

Fig. 1 is a side elevation of my improved ice fishing apparatus in operative position on the ice with the fishing line attached thereto.

Fig. 2 is an enlarged detail view of the buzzer box and upper end of the post with the latter being in section to show the disposition of the dry cell batteries therein and with the perforated cover removed from the box to show the buzzer mechanism and switch means.

Fig. 3 is a partial vertical section through the buzzer box taken along line 3—3 of Fig. 2.

Referring now more particularly to the drawing, reference characters will be used to denote like parts or structural features in the different views. The device, shown in operating position in Fig. 1, is supported over the ice layer I on the body of water W for fishing through the hole H. It comprises generally an upright support 10, a buzzer box 11 mounted on the support 10, a buzzer actuating arm 12 extending from the buzzer box, and a fishing line 13 depending from the arm 12 and downwardly through the hole H.

The support 10 comprises upper and lower tubular sections 14 and 15 rigidly united end to end. The lower end of the section 15 is capped with a spike 15a extending therefrom to be driven into the ice I, as shown, to maintain the support in an upright position. Buzzer box 11 is rigidly mounted on the section 14, the latter being cut away so that the interior of the section is in open communication with the interior of the box. The interior of section 14 above the member 11 forms an elongated cylindrical chamber 16 for holding dry cell batteries 17 used to furnish electric power to the buzzer mechanism to be subsequently described. The upper end of the section 14 is provided with a removable cap 18 with a spiral spring 19 disposed under compression between the cap and the end face of the uppermost battery to urge the batteries downwardly in the chamber 16.

The buzzer box 11 and its contents will now be described in detail. The box is of a relatively flat square design mounted on the post 10 with its narrowest side in alignment therewith. For purposes of reference the wall denoted at 21 will be referred to as the inner side wall of the box, the number 22 indicates the outer side wall, and the numbers 23, 24, and 25, respectively, denote the top, front and bottom walls thereof. The walls 21, 23, 24, and 25 are integrally united and are rigidly disposed with respect to the post section 14. The outer side wall 22 is perforated, as shown in Fig. 1, and is slidably removable being held in place by slide forming flanges 26 and a set screw 27.

Disposed within the box 11 is a buzzer circuit operated electrically from the batteries 17 and a master switch mechanism for opening and closing the circuit, said mechanism being associated with the arm 12 for operation thereby. The switch mechanism will be first described by referring to Fig. 2. There is a base member 29 mounted crosswise on the bottom wall 25 in the position shown. An inverted U-shaped bracket 30 is pivoted, as at 31, to the member 29 for forward and backward swinging movement on a path between the side walls of the box. An elongated tubular socket member 32 is mounted on the cross portion at the upper end of bracket 30. This member forms a socket for receiving and firmly holding the inner end of arm 12, said arm extending into the box through an opening 33 provided in the wall 24. Opening 33 is sufficiently large to allow the arm 12 considerable vertical play.

At the opposite end from arm 12, the member 32 rigidly carries a hook 35 over which is fastened the upper end of a spiral tension spring 36. The lower end of the spring 36 is secured by eye 37 mounted for swivel movement on the end of adjustment screw 38 threaded through bottom wall 25 of the box. Any suitable means, such as lateral projection 39 on base 29, may be used to limit rearward movement of the member 32 about pivot 31 under tension of spring 36. By adjustment of screw 38 the tension of spring 36 may be varied to govern the amount of downward pressure necessary on arm 12 to move the member 32 forwardly about its pivot 31.

A spindle 41a is secured between opposing sides of the bracket 30 and is held in place by the screw 41 extending snugly therethrough. The spindle and screw 41 are suitably insulated from the bracket 30 by insulating collars 41b. A flat spiral spring 42 has its inner end connected to the spindle and circles therearound with its distal end portion 43 extending flatly forward over bottom wall 25.

A terminal post 44 is mounted on the bottom wall 25 to extend upwardly under the spring portion 43 which serves as a contact. Both the spring 42 and the post 44 are part of the buzzer circuit. This circuit includes a spring contact 46 engaging the terminal of the lowermost battery 17 with suitable circuit forming wire connections 47 with a buzzer mechanism having a conventional interrupter, as designated generally at 48. The members 42 and 44 are in the circuit so that when they are in contact the circuit is closed and when they are apart the circuit is open.

The opening and closing of this contact is effected by movement of bracket 30 about its pivot 31 and this in turn is governed by movement of the arm 12. There is a slight dip or hook 50 at the extended end of arm 12 over which the line is draped, as in Fig. 1, or tied. The bracket 30 along with its socket member 32 and spiral spring 42 form a master switch in the buzzer circuit. The switch is normally open under tension of spring 36 which yieldably holds bracket 30 in its rearmost position with contact 43 separated from the post 44. When there is sufficient downward force on the arm 12 to overcome the tension of spring 36 the bracket swings forwardly closing the contact to close the circuit to the buzzer 48 and sound the same. When the force or pressure on arm 12 is removed the switch will return to its open position under tension of spring 36 to terminate the sound. Obviously the amount of pull necessary on arm 12 to close the switch will be determined by the longitudinal adjustment of screw 38.

The contact between bracket 30 and the post 44 is formed of a flat spiral spring so as to be yieldable when the arm 12 is bowed downwardly any considerable distance under pull of the line 13. Furthermore, the arm 12 is preferably of a light resilient metal so as to render the effect of its weight on spring 36 negligible and also to allow it to bow downwardly under intense pull on the line.

It is an important feature of my invention that the signal which it gives is only of a temporary nature requiring the presence of the fisherman in the immediate area in order that the signal be received. This is significant from a legality standpoint in areas where permanent signals are considered illegal. It will be readily understood that in use of my invention, when the line 13 is taken by a fish and pulled downwardly, the pull upon arm 12 will cause it to bow downwardly sounding the buzzer. However, when the arm has been depressed a considerable distance, as will occur when a fish has actually taken the bait, continued pull on the line will cause it to slip off the end of the arm and the arm will return to its original position under action of spring 36 to open the contact 43 and terminate the sound. Thus while the fish is nibbling the line will stay over the arm for continuous intermittent signaling and the signal will not terminate until after the catch.

For purposes of disclosure I have shown the line 13 attached to post 44 and then draped directly over the line holder 50 in the arm 12. It may be preferred, however, to make a loop in the line to place over the hook 50 and then leaving considerable slack in the line between the hook and the line's attachment to the post. This will assure the presence of sufficient line to be let out when a fish has been caught.

While socket member 32 is adapted to hold the arm 12 firmly during operation of the device, the arm may be removed therefrom for storage. A pair of eyelets 51 are mounted at longitudinally spaced points along post 10 for receiving and holding arm 12 in the stored position, as shown in broken lines in Fig. 1. A pair of rigid projections 52 may also be mounted on the post for winding of the line 13 therearound. Thus the device may be rearranged into a very compact unit for storage.

I have accordingly provided a new and improved ice fishing apparatus which economically and effectively carries out the aforementioned objectives. It is understood that suitable modifications may be made in the structure as disclosed, provided that such modifications come within the spirit and scope of the appended claim. Having now therefore fully illustrated and described my invention, what I claim to be new and desire to protect by Letters Patent is:

In an ice fishing apparatus, an elongated support adapted to be mounted in upright position on the ice, a housing mounted on the support, an audible signal mechanism disposed within the housing, an elongated rod pivoted to the housing for up and down movement and extending therefrom at right angles to the support for sounding the signal mechanism as said rod is moved downwardly, and switch means connecting the rod to the housing allowing continued downward movement of the rod about its pivot after the signal mechanism has been sounded, said switch means comprising a fixed contact mounted on the housing, a bracket movable with said rod and pivotally mounted on the housing for swinging movement toward and away from the fixed contact, and a movable contact mounted on the bracket and adapted to engage the fixed contact as the bracket swings toward the fixed contact, said movable contact being of a yieldable material to maintain engagement with the fixed contact with continued movement of the bracket toward said fixed contact.

References Cited in the file of this patent

UNITED STATES PATENTS

| 1,391,002 | Morin | Sept. 20, 1921 |
| 2,170,000 | Eggleston | Aug. 22, 1939 |
| 2,446,427 | Linder | Aug. 3, 1948 |
| 2,556,628 | Nisle | June 12, 1951 |
| 2,567,777 | Massino | Sept. 11, 1951 |
| 2,575,049 | Dean | Nov. 13, 1951 |

FOREIGN PATENTS

| 12,861 | Great Britain | 1894 |
| 463,794 | Canada | Mar. 21, 1950 |
| 733,542 | France | Oct. 7, 1932 |